(12) United States Patent
Chen

(10) Patent No.: US 11,781,645 B2
(45) Date of Patent: Oct. 10, 2023

(54) GEAR SHIFTING DEVICE, TRANSMISSION AND ALL-TERRAIN VEHICLE

(71) Applicant: SEGWAY TECHNOLOGY CO., LTD., Jiangsu (CN)

(72) Inventor: Shangjian Chen, Jiangsu (CN)

(73) Assignee: Segway Technology Co., Ltd., Jiangsu (CN)

( * ) Notice: Subject to any disclaimer, the term of this patent is extended or adjusted under 35 U.S.C. 154(b) by 238 days.

(21) Appl. No.: 17/333,204

(22) Filed: May 28, 2021

(65) Prior Publication Data
US 2021/0372517 A1    Dec. 2, 2021

(30) Foreign Application Priority Data

May 29, 2020   (CN) .......................... 202020941794.2

(51) Int. Cl.
*F16H 59/00*   (2006.01)
*F16H 59/04*   (2006.01)
(Continued)

(52) U.S. Cl.
CPC ........... *F16H 59/044* (2013.01); *B60K 35/00* (2013.01); *F16H 61/0248* (2013.01);
(Continued)

(58) Field of Classification Search
CPC ............... F16H 59/044; F16H 61/0248; F16H 61/2807; F16H 63/42; F16H 55/17; F16H 2061/2892; F16H 59/70; F16H 63/18; B60K 35/00; B60K 2370/152; B60K 2370/167; F16D 2001/102; B60Y 2200/20
See application file for complete search history.

(56) References Cited

U.S. PATENT DOCUMENTS

2008/0314173 A1*  12/2008  Honma .................. F16H 63/18
                                                           74/54

FOREIGN PATENT DOCUMENTS

DE    9017181 U1    3/1991
EP    1967771 A1    9/2008
(Continued)

OTHER PUBLICATIONS

European Patent Office, Search Report for EP application 21176672.0, dated Sep. 17, 2021 (dated Sep. 17, 2021).

*Primary Examiner* — Victor L Macarthur
(74) *Attorney, Agent, or Firm* — Timothy W. Menasco, Esq.; Harter Secrest & Emery LLP

(57) ABSTRACT

A gear shifting device, a transmission, and an all-terrain vehicle are disclosed. The gear shifting device includes: a drive motor having an output shaft fixed with a driving toothed wheel; a transmission drum having a first end fixed with a driven toothed wheel and a second end provided with a gear contactor; a gear sensor having a working surface in contact with the gear contactor; and an electronic control unit electrically coupled to the drive motor. The electronic control unit outputs a drive signal to the drive motor based on a gear shifting instruction, the drive motor rotates based on the drive signal, and the output shaft drives the driving toothed wheel to rotate; the transmission drum and the driven toothed wheel rotate along with rotation of the driving toothed wheel; and the gear contactor rotates to contact one of four contacts corresponding to the gear shifting instruction.

20 Claims, 3 Drawing Sheets

(51) Int. Cl.
  *B60K 35/00*   (2006.01)
  *F16H 61/02*   (2006.01)
  *F16H 61/28*   (2006.01)
  *F16H 63/42*   (2006.01)
  *F16D 1/10*   (2006.01)
  *F16H 55/17*   (2006.01)

(52) U.S. Cl.
  CPC ......... *F16H 61/2807* (2013.01); *F16H 63/42* (2013.01); *B60K 2370/152* (2019.05); *B60K 2370/167* (2019.05); *F16D 2001/102* (2013.01); *F16H 55/17* (2013.01)

(56) References Cited

FOREIGN PATENT DOCUMENTS

JP  2000291796 A  10/2000
JP  2007232022 A   9/2007

\* cited by examiner

GEAR SHIFTING DEVICE, TRANSMISSION AND ALL-TERRAIN VEHICLE

CROSS-REFERENCE TO RELATED APPLICATION

This application claims priority to and benefits of Chinese Application No. 202020941794.2, filed on May 29, 2020, the entire contents of which are incorporated herein by reference.

FIELD

The present disclosure relates to a gear shifting device, a transmission, and an all-terrain vehicle.

BACKGROUND

Gear shifting device are commonly used in all-terrain vehicles, and the all-terrain vehicles can shift gears through the gear shifting devices. However, the gear shifting devices in the related art cannot detect gear information and are inconvenient to use.

SUMMARY

Embodiments of the present disclosure provide a gear shifting device. The gear shifting device includes: a drive motor having an output shaft fixed with a driving toothed wheel; a transmission drum having a first end fixed with a driven toothed wheel and a second end provided with a gear contactor, the driven toothed wheel meshing with the driving toothed wheel; a gear sensor having a working surface in contact with the gear contactor, at least four contacts being arranged on the working surface of the gear sensor, and each contact corresponding to one gear; and an electronic control unit electrically coupled to the drive motor and configured to output a drive signal to the drive motor based on a gear shifting instruction. The electronic control unit outputs the drive signal to the drive motor based on the gear shifting instruction, the drive motor rotates based on the drive signal, and the output shaft drives the driving toothed wheel to rotate; the transmission drum and the driven toothed wheel rotate along with rotation of the driving toothed wheel; and the gear contactor rotates along with the transmission drum to contact one of the at least four contacts corresponding to the gear shifting instruction.

Embodiments of the present disclosure also provides a transmission that includes a gear shifting device. The gear shifting device includes: a drive motor having an output shaft fixed with a driving toothed wheel; a transmission drum having a first end fixed with a driven toothed wheel and a second end provided with a gear contactor, the driven toothed wheel meshing with the driving toothed wheel; a gear sensor having a working surface in contact with the gear contactor, at least four contacts being arranged on the working surface of the gear sensor, and each contact corresponding to one gear; and an electronic control unit electrically coupled to the drive motor and configured to output a drive signal to the drive motor based on a gear shifting instruction. The electronic control unit outputs the drive signal to the drive motor based on the gear shifting instruction, the drive motor rotates based on the drive signal, and the output shaft drives the driving toothed wheel to rotate; the transmission drum and the driven toothed wheel rotate along with rotation of the driving toothed wheel; and the gear contactor rotates along with the transmission drum to contact one of the at least four contacts corresponding to the gear shifting instruction. The transmission includes a first housing and a second housing coupled to each other; the drive motor is fixed outside the first housing; the gear sensor is fixed outside the second housing; and the transmission drum is arranged in an accommodating space formed by the first housing and the second housing.

Embodiments of the present disclosure also provide an all-terrain vehicle that includes a transmission that includes a gear shifting device. The gear shifting device includes: a drive motor having an output shaft fixed with a driving toothed wheel; a transmission drum having a first end fixed with a driven toothed wheel and a second end provided with a gear contactor, the driven toothed wheel meshing with the driving toothed wheel; a gear sensor having a working surface in contact with the gear contactor, at least four contacts being arranged on the working surface of the gear sensor, and each contact corresponding to one gear; and an electronic control unit electrically coupled to the drive motor and configured to output a drive signal to the drive motor based on a gear shifting instruction. The electronic control unit outputs the drive signal to the drive motor based on the gear shifting instruction, the drive motor rotates based on the drive signal, and the output shaft drives the driving toothed wheel to rotate; the transmission drum and the driven toothed wheel rotate along with rotation of the driving toothed wheel; and the gear contactor rotates along with the transmission drum to contact one of the at least four contacts corresponding to the gear shifting instruction. The transmission includes a first housing and a second housing coupled to each other; the drive motor is fixed outside the first housing; the gear sensor is fixed outside the second housing; and the transmission drum is arranged in an accommodating space formed by the first housing and the second housing.

DETAILED DESCRIPTION

Figure 1:
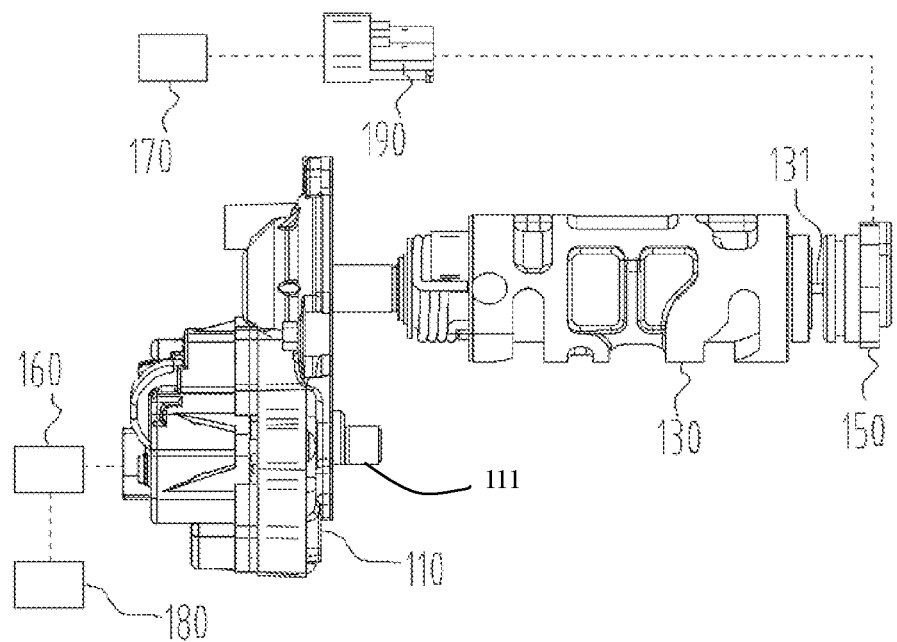
FIG. 1 is a schematic diagram of a structure of a gear shifting device according to embodiments of the present disclosure.

The present disclosure will be further described in detail in combination with the accompanying drawings and specific embodiments. It should be understood that the specific embodiments described herein are merely intended to explain the present disclosure rather than limit the present disclosure.

In the description of the embodiments of the present disclosure, it should be noted that, unless otherwise specified and limited, the term "coupled" should be understood in a broad sense, and may be for example electrical connection, communication between two elements, direct connection, or indirect connection via intermediate media, which can be understood by those skilled in the art according to specific situations.

It should be noted that the terms "first/second/third" in the embodiments of the present disclosure are merely used to distinguish similar objects rather than represent a specific order of the objects. It can be understood that, the terms "first/second/third" are interchangeable in a specific order or a sequential order. It should be understood that the objects distinguished by "first/second/third" are interchangeable under appropriate circumstances, so that the embodiments of the present disclosure described herein can be implemented in an order other than those illustrated or described herein.

It should be noted that the embodiments in the present disclosure and features in the embodiments can be combined with each other without conflict. A gear shifting device according to the embodiments of the present disclosure will be described in detail with reference to FIGS. 1-5.

The gear shifting device includes: a drive motor 110 having an output shaft 111 fixed with a driving toothed wheel 120; a transmission drum 130 having a first end fixed with a driven toothed wheel 140 and a second end provided with a gear contactor 131, the driven toothed wheel 140 being configured to mesh with the driving toothed wheel 120; a gear sensor 150 having a working surface in contact with the gear contactor 131, at least four contacts 151 being arranged on the working surface of the gear sensor 150, and each contact 151 corresponding to one gear; and an electronic control unit 160 electrically coupled to the drive motor 110 and configured to output a drive signal to the drive motor 110 based on a gear shifting instruction. The electronic control unit 160 outputs the drive signal to the drive motor 110 based on the gear shifting instruction, and the drive motor 110 in turn rotates based on the drive signal. The output shaft 111 drives the driving toothed wheel 120 to rotate; the transmission drum 130 and the driven toothed wheel 140 rotate along with the rotation of the driving toothed wheel 120; and the gear contactor 131 rotates along with the transmission drum 130 to contact one of the at least four contacts 151. At this moment, the gear sensor 150 detects gear information corresponding to the gear shifting instruction. Since the gear information corresponding to the gear shifting instruction can be detected by the gear sensor 150, the gear shifting device is convenient to use.

In the embodiments of the present disclosure, the implementation mode that the output shaft 111 of the drive motor 110 is fixed with the driving toothed wheel 120 will not be limited. In some embodiments, the driving toothed wheel 120 is fixedly coupled to the output shaft 111 through keys. In some embodiments, a first key slot 1111 is formed in the output shaft 111; and a second key slot 1211 is formed in a connection hole of the driving toothed wheel 120. The gear shifting device may further include a key 121 snapped in the first key slot 1111 and the second key slot 1211. The key 121 here may be a spline or a flat key.

Figure 2:
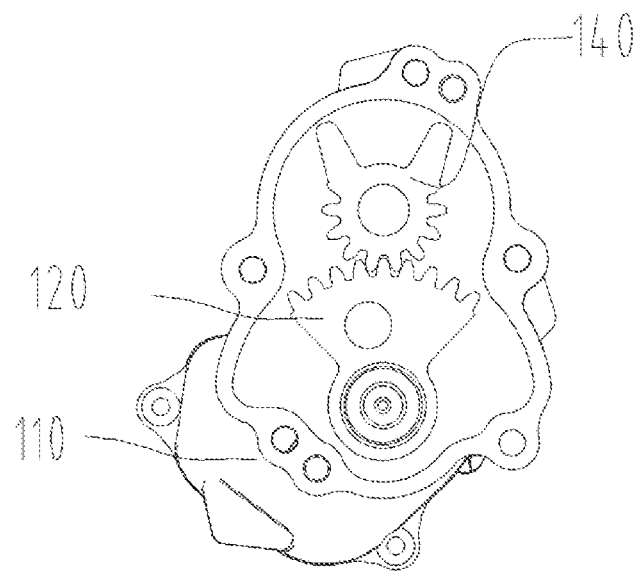
FIG. 2 is a schematic diagram of a partial structure of the gear shifting device according to the embodiments of the present disclosure.
Figure 3:
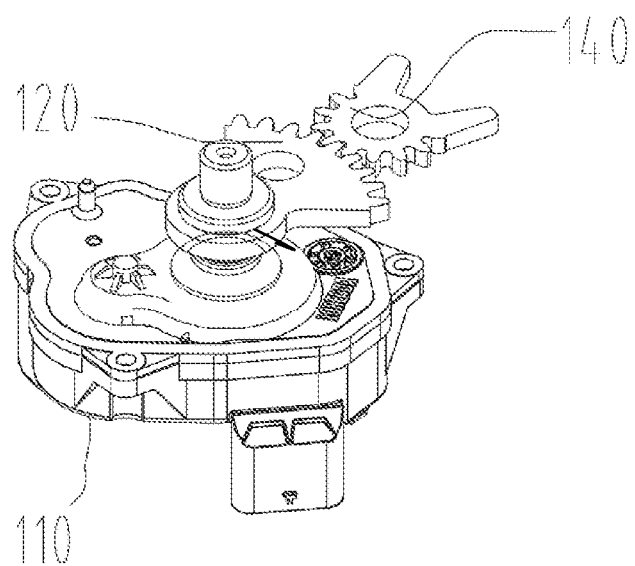
FIG. 3 is a schematic diagram of a partial structure of the gear shifting device according to the embodiments of the present disclosure.

The structure of the driving toothed wheel 120 is not limited here. In some embodiments, as shown in FIGS. 2 and 3, the driving toothed wheel 120 may be a sector gear, which can reduce the space occupied by the driving toothed wheel 120 to miniaturize the gear shifting device, and can also reduce the weight and cost of the gear shifting device. In some embodiments, the driving toothed wheel 120 may also be a circular gear.

In the embodiments of the present disclosure, the first end of the transmission drum 130 is fixed with the driven toothed wheel 140, so that the first end of the transmission drum 130 achieves cooperation and connection with the drive motor 110 by meshing between the driven toothed wheel 140 and the driving toothed wheel 120, and thus the drive motor 110 can drive the transmission drum 130 to rotate.

The structure of the driven toothed wheel 140 is not limited here. In some embodiments, as shown in FIGS. 2 and 3, the driven toothed wheel 140 is a sector gear, which can reduce the space occupied by the driven toothed wheel 140 to miniaturize the gear shifting device, and can also reduce the weight and cost of the gear shifting device. In some embodiments, the driven toothed wheel 140 may also be a circular gear.

It should be noted that both the driving toothed wheel 120 and the driven toothed wheel 140 may be sector gears, or only one of them is a sector gear.

Figure 5:
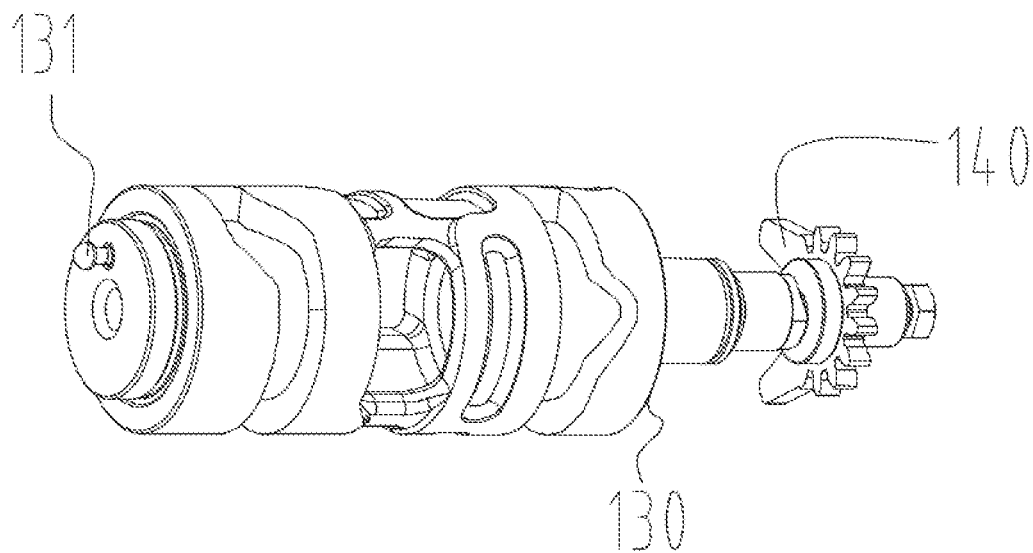
FIG. 5 is a schematic diagram of a structure of a transmission drum in the gear shifting device according to the embodiments of the present disclosure.
Figure 6:
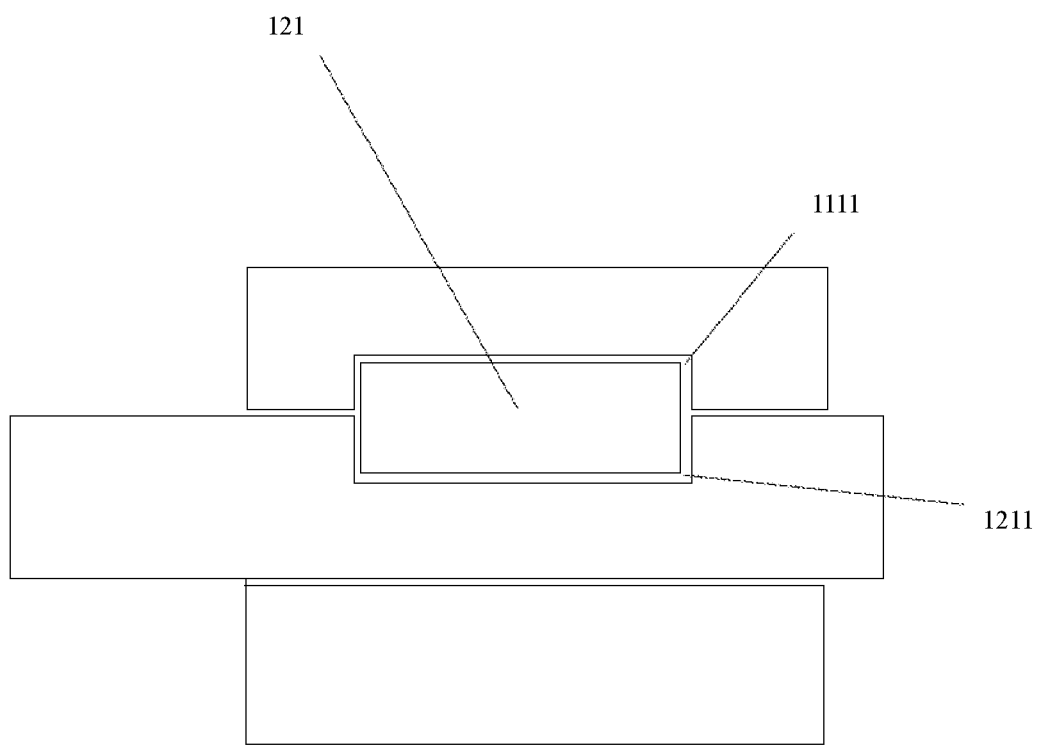
FIG. 6 is a schematic diagram illustrating a key and a key slot according to the embodiments of the present disclosure.

The gear contactor 131 is arranged at the second end of the transmission drum 130 and outside a rotation axis of the transmission drum 130, so that the gear contactor 131 can rotate to different positions around the rotation axis of the transmission drum 130 when the transmission drum 130 rotates. As shown in FIG. 5, the gear contactor 131 is arranged on a protrusion of the second end of the transmission drum 130. In some embodiments, the gear contactor 131 can also be arranged on a columnar structure of the second end of the transmission drum 130.

In the embodiments of the present disclosure, the working surface of the gear sensor 150 refers to a surface of the gear sensor 150 provided with the contacts 151.

Figure 4:
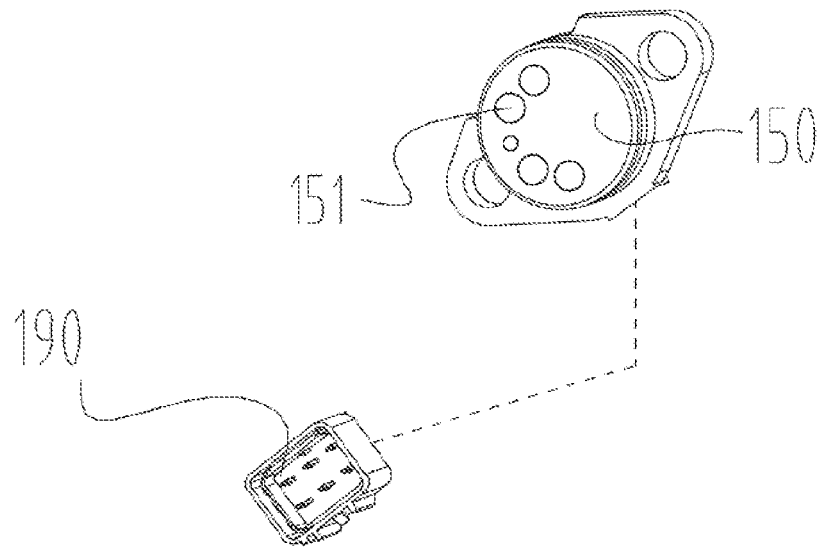
FIG. 4 is a schematic diagram of a structure of a gear sensor in the gear shifting device according to the embodiments of the present disclosure.

The number of the contacts 151 is not limited here. In some embodiments, as shown in FIG. 4, there are five contacts 151.

The arrangement of the at least four contacts 151 is not limited here. In some embodiments, as shown in FIG. 4, the at least four contacts 151 may be arranged at intervals and in a semi-annular shape. In some embodiments, the at least four contacts 151 may also be arranged at intervals and in an annular shape.

In the embodiments of the present disclosure, the electronic control unit 160 outputs the drive signal to the drive motor 110 based on the gear shifting instruction, and the drive motor 110 rotates by an angle corresponding to the gear shifting instruction based on the drive signal. The output shaft 111 drives the driving toothed wheel 120 to rotate; the transmission drum 130 and the driven toothed wheel 140 rotate along with the rotation of the driving toothed wheel 120; and the gear contactor 131 rotates along with the transmission drum 130 to contact one of the at least four contacts 151 corresponding to the gear shifting instruction. At this moment, the gear sensor 150 detects the gear information corresponding to the gear shifting instruction. The rotation of the drive motor 110 can be controlled automatically by the electronic control unit 160. The transmission drum 130 can be brought into rotation by meshing between the driving toothed wheel 120 and the driven toothed wheel 140. The gear contactor 131 is in contact with one of the at least four contacts 151 corresponding to the gear shifting instruction when the transmission drum 130 drives the gear contactor 131 to rotate. It should be noted that the number of types of gear shifting instructions is the same as the number of contacts 151, and a definite gear shifting instruction is in contact with one contact 151 of the at least four contacts corresponding to the gear shifting instruction, so that the gear sensor 150 can detect the gear information corresponding to the gear shift instruction when the gear contactor 131 rotates along with the transmission drum 130 to contact one of the at least four contacts 151.

In some implementations of the embodiments of the present disclosure, as shown in FIG. 1, the gear shifting device may further include a gear instrument 170 electrically coupled to the gear sensor 150 and configured to display the gear information detected by the gear sensor 150, so that the gear information can be observed intuitively, and the adaptability of the gear shifting device can be improved.

In the present implementation, the gear sensor 150 may further include a patch plug 190, and the gear sensor 150 is electrically coupled to the gear instrument 170 through the patch plug 190.

In some embodiments, the gear sensor 150 can also be electrically coupled to the gear instrument 170 through a wire.

In some implementations of the embodiments of the present disclosure, the gear shifting device may further include a manipulation device 180 electrically coupled to the electronic control unit 160 and configured to input a gear shifting instruction. The electronic control unit 160 outputs a drive signal to the drive motor 110 based on the gear shifting instruction input by the manipulation device 180, so that the gear shifting can be realized by the manipulation device 180, greatly improving the adaptability of the gear shifting device.

The structure of the manipulation device 180 is not limited here. In some embodiments, the manipulation device 180 may include a gear button to input the gear shifting instruction by pressing the gear button. In some embodiments, the manipulation device 180 may include a shift lever to input the gear shifting instruction by swinging the shift lever. In some embodiments, the manipulation device 180 may include a gear knob to input the gear shifting instruction by turning the gear knob. The manipulation device 180 can be of other structural types as long as it is convenient for a user to input the gear shifting instruction.

It should be noted that dashed lines in FIGS. 1-5 indicate electrical connection.

The embodiments of the present disclosure also provide a transmission that includes the gear shifting device in the above embodiments of the present disclosure. The transmission includes a first housing and a second housing coupled to each other. The drive motor is fixed outside the first housing; the gear sensor is fixed outside the second housing; and the transmission drum is arranged in an accommodating space formed by the first housing and the second housing.

The embodiments of the present disclosure also provide an all-terrain vehicle that includes the gear shifting device in the above embodiments of the present disclosure.

Only specific embodiments of the present disclosure are discussed in the above, and the protection scope of the present disclosure is not limited thereto. Variations or substitutions, which are conceivable to those skilled in the art within the technical scope revealed by the present disclosure, should fall into the protection scope of the present disclosure. Therefore, the protection scope of the present disclosure should be subject to the protection scope of the claims.

What is claimed is:

1. A gear shifting device, comprising:
    a drive motor having an output shaft fixed with a driving toothed wheel;
    a transmission drum having a first end directly fixed to rotate with a driven toothed wheel about a common axis and a second end provided with a gear contactor, the driven toothed wheel meshing with the driving toothed wheel;
    a gear sensor having a working surface in contact with the gear contactor, at least four contacts being arranged on the working surface of the gear sensor, and each contact corresponding to one gear; and
    an electronic control unit electrically coupled to the drive motor and configured to output a drive signal to the drive motor based on a gear shifting instruction,
    wherein the drive motor rotates based on the drive signal, and the output shaft drives the driving toothed wheel to rotate; the transmission drum and the driven toothed wheel rotate along with rotation of the driving toothed wheel; and the gear contactor rotates along with the transmission drum to contact one of the at least four contacts corresponding to the gear shifting instruction.

2. The gear shifting device according to claim 1, further comprising:
    a gear instrument electrically coupled to the gear sensor and configured to display gear information detected by the gear sensor.

3. The gear shifting device according to claim 2, wherein the gear sensor further comprises a patch plug, wherein the gear sensor is electrically coupled to the gear instrument through the patch plug.

4. The gear shifting device according to claim 1, further comprising:
    a manipulation device electrically coupled to the electronic control unit and configured to input the gear shifting instruction, wherein the electronic control unit outputs the drive signal to the drive motor based on the gear shifting instruction input by the manipulation device.

5. The gear shifting device according to claim 4, wherein the manipulation device is a shift lever, a gear button, or a gear knob.

6. The gear shifting device according to claim 1, wherein at least one of the driving toothed wheel and the driven toothed wheel is a sector gear.

7. The gear shifting device according to claim 1, wherein a first key slot is formed in the output shaft, and a second key slot is formed in a connection hole of the driving toothed wheel;
    the gear shifting device further comprises a key snapped in the first key slot and the second key slot.

8. The gear shifting device according to claim 1, wherein the at least four contacts are arranged at intervals and in a semi-annular shape.

9. The gear shifting device according to claim 1, wherein the gear contactor is arranged outside a rotation axis of the transmission drum and is rotatable around the rotation axis to different positions.

10. The gear shifting device according to claim 1, wherein the gear contactor is arranged on a protrusion of the second end of the transmission drum.

11. The gear shifting device according to claim 1, wherein the gear contactor is arranged on a columnar structure of the second end of the transmission drum.

12. The gear shifting device according to claim 1, wherein the at least four contacts are arranged at intervals and in an annular shape.

13. The gear shifting device according to claim 1, wherein the number of types of gear shifting instructions is the same as the number of the contacts.

14. A transmission, comprising a gear shifting device, wherein the gear shifting device comprises:
    a drive motor having an output shaft fixed with a driving toothed wheel;

a transmission drum having a first end directly fixed to rotate with a driven toothed wheel about a common axis and a second end provided with a gear contactor, the driven toothed wheel meshing with the driving toothed wheel;

a gear sensor having a working surface in contact with the gear contactor, at least four contacts being arranged on the working surface of the gear sensor, and each contact corresponding to one gear; and an electronic control unit electrically coupled to the drive motor and configured to output a drive signal to the drive motor based on a gear shifting instruction, wherein the drive motor rotates based on the drive signal, and the output shaft drives the driving toothed wheel to rotate; the transmission drum and the driven toothed wheel rotate along with rotation of the driving toothed wheel; and the gear contactor rotates along with the transmission drum to contact one of the at least four contacts corresponding to the gear shifting instruction, wherein the transmission comprises a first housing and a second housing coupled to each other, wherein the drive motor is fixed outside the first housing; the gear sensor is fixed outside the second housing; and the transmission drum is arranged in an accommodating space formed by the first housing and the second housing.

15. The transmission according to claim 14, wherein the gear shifting device further comprises: a gear instrument electrically coupled to the gear sensor and configured to display gear information detected by the gear sensor.

16. The transmission according to claim 15, wherein the gear sensor further comprises a patch plug, wherein the gear sensor is electrically coupled to the gear instrument through the patch plug.

17. The transmission according to claim 14, wherein the gear shifting device further comprises:

a manipulation device electrically coupled to the electronic control unit and configured to input the gear shifting instruction, wherein the electronic control unit outputs the drive signal to the drive motor based on the gear shifting instruction input by the manipulation device.

18. The transmission according to claim 14, wherein a first key slot is formed in the output shaft, and a second key slot is formed in a connection hole of the driving toothed wheel;

the gear shifting device further comprises a key snapped in the first key slot and the second key slot.

19. The transmission according to claim 14, wherein the at least four contacts are arranged at intervals and in a semi-annular shape.

20. An all-terrain vehicle, comprising a transmission comprising a gear shifting device, wherein the gear shifting device comprises:

a drive motor having an output shaft fixed with a driving toothed wheel;

a transmission drum having a first end directly fixed to rotate with a driven toothed wheel about a common axis and a second end provided with a gear contactor, the driven toothed wheel meshing with the driving toothed wheel;

a gear sensor having a working surface in contact with the gear contactor, at least four contacts being arranged on the working surface of the gear sensor, and each contact corresponding to one gear; and an electronic control unit electrically coupled to the drive motor and configured to output a drive signal to the drive motor based on a gear shifting instruction, wherein the drive motor rotates based on the drive signal, and the output shaft drives the driving toothed wheel to rotate; the transmission drum and the driven toothed wheel rotate along with rotation of the driving toothed wheel; and the gear contactor rotates along with the transmission drum to contact one of the at least four contacts corresponding to the gear shifting instruction, wherein the transmission comprises a first housing and a second housing coupled to each other, wherein the drive motor is fixed outside the first housing; the gear sensor is fixed outside the second housing; and the transmission drum is arranged in an accommodating space formed by the first housing and the second housing.

* * * * *